June 6, 1967   W. L. GREEN ETAL   3,323,370
MASS MEASURING SYSTEM
Filed Dec. 16, 1964   3 Sheets-Sheet 1

William L. Green
Richard W. Bricker
INVENTORS

BY
ATTORNEYS

June 6, 1967    W. L. GREEN ET AL    3,323,370
MASS MEASURING SYSTEM
Filed Dec. 16, 1964    3 Sheets-Sheet 2
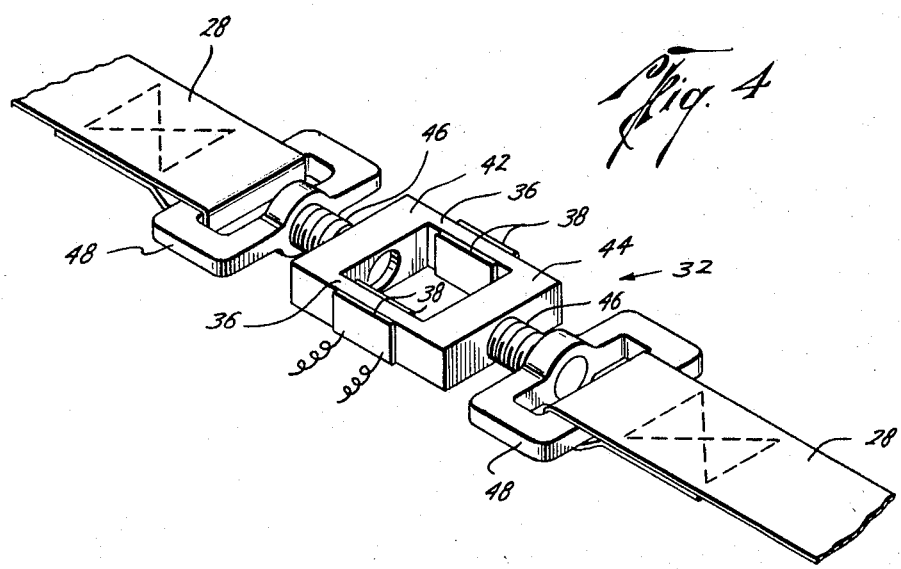
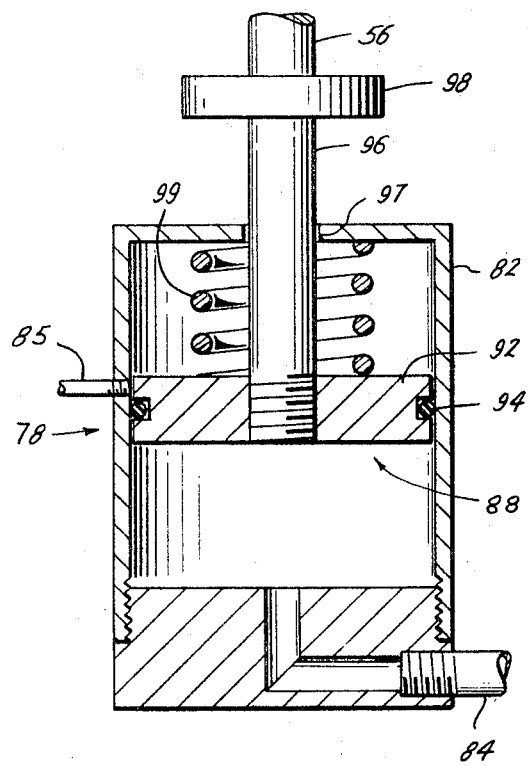
William L. Green
Richard W. Bricker
INVENTORS
BY
ATTORNEYS June 6, 1967     W. L. GREEN ETAL     3,323,370
MASS MEASURING SYSTEM
Filed Dec. 16, 1964     3 Sheets-Sheet 3

William L. Green
Richard W. Bricker
INVENTORS

BY
ATTORNEYS

United States Patent Office 3,323,370
Patented June 6, 1967

3,323,370
MASS MEASURING SYSTEM
William Lawrence Green, Houston, and Richard W. Bricker, La Porte, Tex., assignors to the United States of America as represented by the Administrator of the National Aeronautics and Space Administration
Filed Dec. 16, 1964, Ser. No. 418,931
2 Claims. (Cl. 73—432)

ABSTRACT OF THE DISCLOSURE

The system relates to the measurement of the mass of a body where there is a zero gravity or a reduced gravity environment. A measured acceleration is applied to the body, and the force applied to the body, caused by the acceleration, is measured. From the measurement of the force and acceleration, the mass may be calculated.

---

The invention described herein may be manufactured and used by the Government of the United States of America for governmental purposes without the payment of any royalties thereon or therefor.

This invention relates in general to mass measuring systems and, more particularly, to a device for determining the mass (either total, or on an incremental basis) of a subject in a gravitational environment different than that of the earth.

When a human being who normally functions in earth's gravitational environment is subjected to a non-earth gravitational environment for prolonged periods of time, normal biological functions of the body may be upset. The acclimation of the human body to the new environment may manifest itself as a redistribution of body mass caused by abnormal usage of certain connective and supportive tissues and body organs. If the variations in mass at certain positions along the length of a given body were known as functions of time, and could be compared with "normal" mass distribution data (obtained by regression analysis, or other standard techniques) a measure of the body's physical condition could be obtained, and used in the manner temperature or blood pressure data are used, to provide a basis for recommendation of physiological corrective action.

Of course, such body mass is not to be confused with the body weight. While the weight of a body is a function of the mass, mass is the maeasure of the body's inertia, whereas weight is a localized quantity caused by the interaction of the body's mass and the local gravitational or acceleration field.

In order to determine changes of mass with respect to time of certain portions of the subject's body, the measuring system of the present invention is constructed so that measurement of the relative mass of various portions of the body may be made in gravitational environments other than that encountered on earth. The mass of the object is determined by measuring of force (F) applied thereto and dividing this force by the measured acceleration ($a$) of the mass caused by the force.

More specifically, according to one of the embodiments of the invention, the mass measuring apparatus comprises a frame which is secured to the "floor" of one of the compartments of an orbiting rotating space station or other environment having a gravitational field not normally encountered on earth. The frame is positioned so that it contains the subject in an attitude normal to the local acceleration field. At one end of the frame there is a footboard, against which the subject's feet are placed so that he is oriented in the same manner with respect to the apparatus each time the apparatus is used. Spaced across the frame are measuring members comprising straps containing load cells therein. The body to be measured is laid across the straps so that the straps support the body at various portions, such as the head, shoulders, buttocks, calves, and feet. Measurement of the force applied by the body to the straps may be determined from the load cell output signals, and the acceleration to which the body is subjected may be read on an accelerometer, or determined by measurement of the space station's angular velocity. Utilization of these two values will yield a measure of the subject's mass.

In an alternative embodiment where there is a near zero-gravity environment, a frame is secured to a stationary body and has at one end thereof a footboard for positioning the subject's feet. Spaced traversely along the frame are rigid U-shaped support bars which are fastened to the frame so that they can be positioned along the frame. Each of the legs of the U-shaped members contains a load cell. The body to be measured is laid across the connecting bar of the U-shaped member and the body is secured thereto by means of a restraint mechanism. The apparatus is accelerated and the amount of acceleration may be measured by an accelerometer mounted on and moving with the frame. Further, the forces applied to the load cells, which are caused by the acceleration of the body, may be read from the load cells at a given instant during the acceleration period and the acceleration read from the accelerometer at the same instant, from which a measure of the mass of the portion of the body supported by each of the bars may be computed. Of course, the summation of the masses measured by each load cell will equal the total mass of the body.

The advantages of this invention, both as to its construction and mode of operation, will be readily appreciated as the same become better understood by reference to the following detailed description when considered in connection with the accompanying drawings in which like reference numerals designate like parts throughout the figures, and wherein:

FIG. 4 is a perspective view of a typical load cell to be used with the system of FIGS. 2 and 3;

FIG. 8 is a sectional view of typical pneumatic thrust device used to accelerate the couch of FIG. 5.

Figure 1:
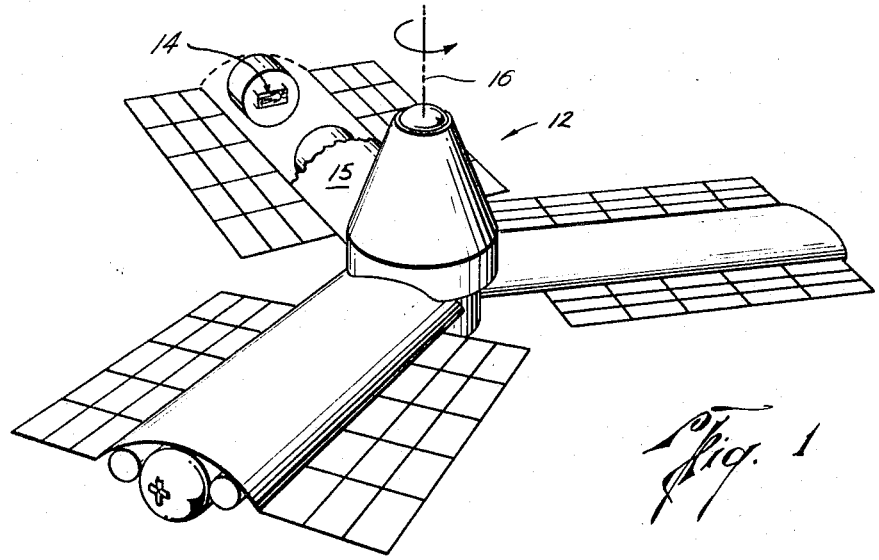
FIG. 1 is a perspective view, partially cut away, of an orbiting, rotating space station embodying the novel measuring system in acocrdance with this invention.

Referring now to the drawings, there is shown in FIG. 1 an orbiting space station 12 having an embodiment of the novel apparatus 14 in accordance with this invention mounted in one of the radial module structures 15 of the vehicle.

A typical orbiting space station is described in U.S. patent application Ser. No. 339,040, filed Jan. 20, 1964. The space station is rotated about the hub structure axis 16 to provide stability and produce an artificial gravity in the radial module structures. Each radial module is divided into several compartments by floors which are rigidly attached in the modules at various distances from the rotation axis of the station. A different level of artificial gravity is produced for each compartment which is directly proportional to the magnitude of the radial distance of the floor of the compartment from the rotation axis.

Figure 2:
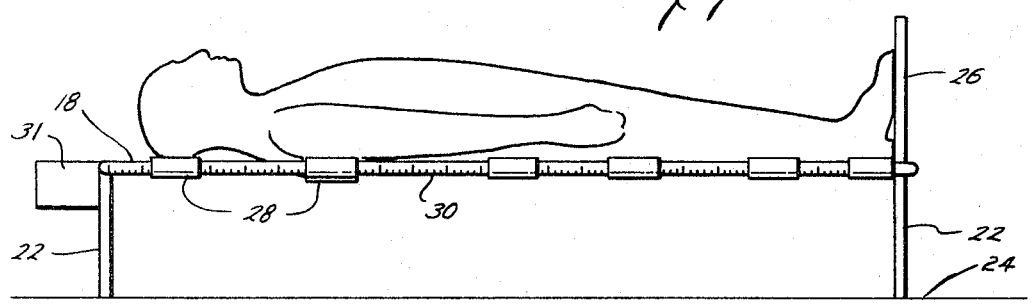
FIG. 2 is a side view of the mass measuring system for use in the space station of FIG. 1 in accordance with this invention.
Figure 3:
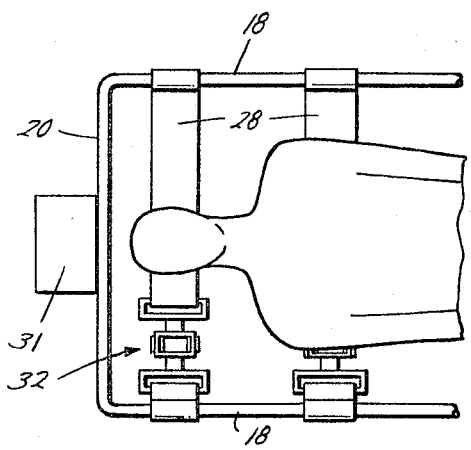
FIG. 3 is a partial top view of the system of FIG. 2.

The apparatus 14 is shown in greater detail in FIGS. 2 and 3, and comprises a frame having a pair of rigid side rails 18 and a pair of rigid end rails 20, which are secured by rigid mounting members 22 to the floor 24 of a compartment of the space station. At one end of the frame is a footboard 26 where the subject to be measured positions his feet. Secured along the rails of the frame are semirigid straps 28 which support the subject. The straps are movable along the side rails 18 so that they may be positioned under various portions of the body so as to allow the straps to support the same portion of the body of persons of different heights. The straps 28 are normally positioned at the center of vital body portions, such as the head, the shoulders, the buttock, the thighs, the calves, and the feet. In order to position each of the straps for a given individual at the same position for measurements at different times, a scale 30 is provided along the side rails 18. An accelerometer 31 is mounted on one of the end rails 20 to measure the normal component of acceleration caused by rotation of the space station about its hub axis 16.

Contained in each of the straps are load cells 32 which measure the force applied by the subject's body to each of the straps, as will be explained hereinafter. Since the space station is not necessarily rotated to produce the same gravity field as is found on earth, the force applied to the straps is not a true measure of the earth weight of the portion of the body at the strap, but is proportional thereto and is dependent upon the acceleration field present in the compartment.

The mass of the portion of the body supported by each strap can be determined by reading the force applied to the load cell and converting it to mass by the formula $$M_i = \frac{F_i}{a} \quad (1)$$

where:

$i$ is the $i$th strap;
$M_i$ is equal to the mass suported by the $i$th strap;
$a$ is the acceleration of the subject which is measured on the accelerometer or calculated from the measured angular velocity of the space station and the radial distance from the subject to the rotational axis of the space station;
$F_i$ is the force applied to the load cell associated with the $i$th strap.

A typical load cell utilized in the couch of FIG. 2 is depicted in greater detail in FIG. 4, and comprises a pair of metal cores 36 having resistive elements 38 mounted thereon. The cores are interconnected by a pair of supports 42, 44. The supports have screws 46 attached thereto which in turn are bolted to buckles 48. The buckles in turn are fastened to portions of the strap 28. Upon application of a force to the strap 28, such as a mass being placed thereon in the presence of an acceleration field, the resistive elements 38 tend to change electrical resistance values. The change in electrical resistance, which is proportional to the force applied to the strap 28 by the portion of the body resting thereon, may be measured by an appropriate electrical circuit connected to the resistive elements 38. The output of the electrical circuit may be connected to a recorder so that the force measured by each of the cells 32 may be plotted as a function of time.

Figure 5:
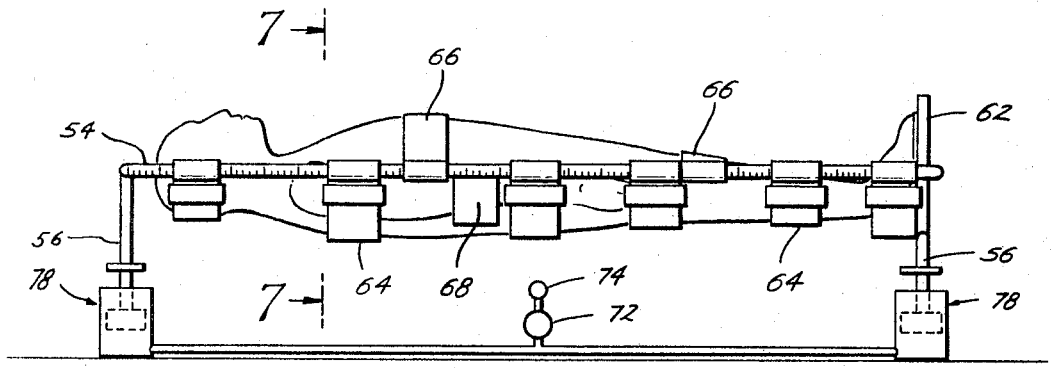
FIG. 5 is a side view of the system of FIG. 2, modified for use in a near zero-gravity environment.
Figure 6:
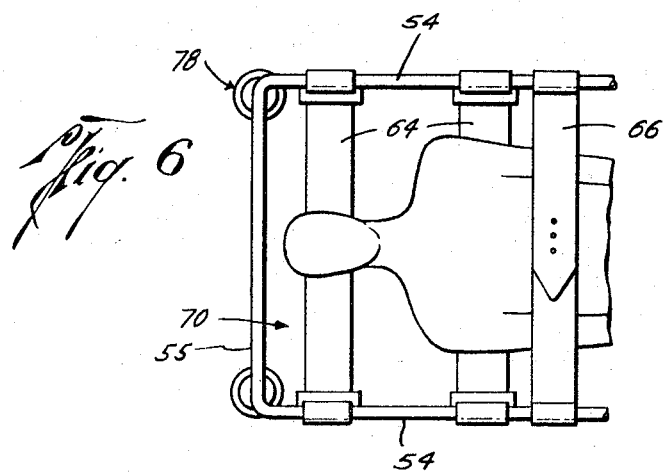
FIG. 6 is a partial top view of the system of FIG. 5.
Figure 7:
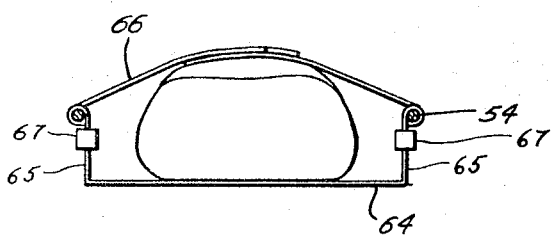
FIG. 7 is a view of one of the support mechanisms used in the system of FIGS. 5 and 6.

Referring now to FIGS. 5, 6, and 7, there is shown an alternate embodiment of the apparatus which may be utilized in a near zero-gravity environment. A frame, having a pair of side rails 54 and a pair of end rails 55, is suported by rigid base members 56. A footboard 62 is secured to the frame and rigid bars 64 are provided in a plane parallel to the frame for allowing the subject to rest thereon. The subject is secured to the bars by means of restraining belts 66. The bars 64 are connected to the side rails 54 and are movable therealong by means of a pair of rigid connecting members 65, the members 65 of each pair containing a load cell 67 similar to the type utilized in the embodiment of FIG. 2. An accelerometer 68 is secured to the frame to measure acceleration of the frame.

The support mechanism of FIG. 5, comprising rigid bars 64 and connecting members 65, are preferred over the support mechanism of FIG. 2 where a substantial deflection of the mass support members may occur upon placement of the mass thereon. The load cell of FIG. 5 measures the total force applied by the mass, whereas in the embodiment of FIG. 2, should a substantial deflection of the strap 28 occur, the force on the strap caused by the acceleration of the mass placed thereon would have to be determined from the load cell reading and, in addition, the measurement of the strap deflection angle. Of course, the mass support means of FIGS. 2 and 5 are interchangeable and the illustrated support means should not be considered to be restricted to the illustrated accompanying systems. Further, alternative type load cells and support mechanisms could be used without departure from the scope of the invention.

In the device of FIG. 5, a source of fluid pressure is pumped into a pressure storage tank 72 through a check valve 74 which prevents the fluid in the tank from leaking back into the source. Upon reaching the desired pressure in the storage tank, the fluid is released into thrust cylinders 78 which are at the bottom of the members 56. The frame is caused to accelerate in a direction perpendicular to the direction that the subject is lying, causing the frame and the body to accelerate for a short period of time. The amount of acceleration is measured during this time interval by the accelerometer and may be plotted by a recorder connected to the accelerometer as a function of time. This acceleration is compared at a given instant with the force applied to each of the load cells at that same instant, and by use of Formula 1 the results of the inertial loading on each of the straps can be computed. Of course, the summation of the masses calculated from the measured quantities would be equal to the total body mass of the subject.

As can be readily seen, the devices of FIGS. 5, 6 and 7 allows the mass of the subject to be easily determined in a zero-gravity environment. The restraining belts 66 prevent further motion of the subject following the brief acceleration period. The system allows body portions to be measured and these results may be compared with previous and future results to determine any redistribution in body mass due to the subject's acclimation to non-earth gravitational conditions, which may result in physiological abnormalities to the subject.

Referring now to FIG. 8, there is shown a sectional view of one of the thrust cylinders 78 used in FIG. 5 to accelerate the couch when used in a near zero-gravitational environment. The cylinders comprise a housing 82 having connected thereto a fluid inlet 84 for connection to the tank 72, and a fluid outlet port 85 for allowing the fluid to exit the housing. The base members 56 of the couch are connected to a piston 88 comprising a cylindrical member 92 having a seal 94 around the outer edge thereof. A shaft 96, which protrudes through an opening 97 in the housing 82, connects the member 92 to a stop 98 which in turn is connected to the base member 56. The piston 88 is kept in a lowered position relative to the housing 82 by means of a spring 99 connected between the top portion of the housing 82 and one side of the member 92. Upon fluid pressure entering the housing 82 through the inlet 84, the member 92 tends to rise which in turn causes the base members 56 to rise, thus accelerating the couch relative to the housing 82 until the expanding fluid leaves the thrust cylinder housing through the exit ports. Thereafter the base 56 tends to lower due to the spring 99 so that the device is once again set for another acceleration. It should be noted that due to the zero-gravity condition, were it not for the spring 99 the couch would tend to remain in a raised position.

While the system described herein has been illustrated for measuring the mass of a human being, it would be obvious to those skilled in the art that the systems could be used to measure the mass of an object which is transferred to a spacecraft during a mission so as to determine the increased payload of the spacecraft. Such information would be necessary in order to redistribute the load of the spacecraft so that an optimum center of gravity may be maintained which is necessary for proper guidance and control of the spacecraft.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed and desired to be secured by Letters Patent is:

1. A measuring system for determining the mass of an object, said system comprising:
   a rigid frame having a first and a second side rail, and a first and a second end rail, said first end rail being secured at its ends to one end of each of said side rails, and the second of said end rails being secured at its ends to the other ends of each of said side rails;
   a footboard secured to said frame at one end thereof for positioning the object to be measured;
   a plurality of rigid mounting members each having a first end and a second end, each of said mounting members being secured to said frame at said first end, each of said mounting members extending away from said frame in the same direction;
   a plurality of members for supporting said object at different locations of said object, said members comprising a pair of leg members each having a first end and a second end, and a connecting member joining said first ends of each pair of said leg members, said second end of each pair of said leg members being slidably connected at said second ends to said first side rail and said second side rails, respectively, said leg members extending away from said frame in the same direction as said mounting base members;
   a load cell interposed in each of said leg members for measuring the force of said mass applied to each of said connecting members;
   means connected to said second ends of said mounting members for accelerating said rigid frame;
   means for measuring the acceleration of said frame; and
   restraint means for securing said object to said connecting members.

2. A measuring system for determining the mass of an object, said system comprising:
   a rigid frame having a first and a second side rail, and a first and a second end rail, said first end rail being secured at its ends to one end of each of said side rails, and the second of said end rails being secured at its ends to the other ends of each of said side rails;
   a plurality of rigid mounting members each having a first end and a second end, each of said mounting members being secured to said frame at said first end;
   a plurality of members for supporting said object at different locations of said object, said members comprising a pair of leg members each having a first end and a second end, and a connecting member joining said first ends of each pair of said leg members, said second ends of each pair of said leg members being slidably connected at said second ends to said first side rail and said second side rail, respectively;
   a load cell interposed in at least one of each of said pair of leg members for measuring the force of said mass applied to each of the connecting members;
   means connected to said second ends of said mounting members for eccelerating said rigid frame;
   means for measuring the acceleration of said frame; and
   restraint means for securing said object to said connecting member.

References Cited

UNITED STATES PATENTS

| 2,751,610 | 6/1959 | Griswold | 5—348 |
| 2,982,122 | 5/1961 | Schatz et al. | 73—12 |
| 3,090,226 | 5/1963 | Corti et al. | 73—141 |
| 3,270,564 | 9/1966 | Evans | 73—432 |

DAVID SCHONBERG, *Primary Examiner.*